United States Patent
Shimono et al.

(10) Patent No.: US 7,174,484 B2
(45) Date of Patent: Feb. 6, 2007

(54) DATA TRANSMISSION SYSTEM

(75) Inventors: Hiroyuki Shimono, Kanagawa (JP);
Kunimitsu Itashiki, Kawasaki (JP);
Teruhiko Suzuki, Kawasaki (JP); Shuji Miyake, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 573 days.

(21) Appl. No.: 10/294,123

(22) Filed: Nov. 14, 2002

(65) Prior Publication Data
US 2003/0131301 A1    Jul. 10, 2003

(30) Foreign Application Priority Data
Jan. 7, 2002   (JP) .............................. 2002-000533

(51) Int. Cl.
*H03M 9/00* (2006.01)
*H04L 7/04* (2006.01)

(52) U.S. Cl. ..................................... 714/700
(58) Field of Classification Search ................ 714/700
See application file for complete search history.

(56) References Cited

U.S. PATENT DOCUMENTS

| | | | | |
|---|---|---|---|---|
| 3,708,783 A | * | 1/1973 | Hedin | .................. 714/746 |
| 4,357,702 A | * | 11/1982 | Chase et al. | .................. 714/700 |
| 4,646,329 A | * | 2/1987 | Bojarski | ...................... 375/373 |
| 5,887,039 A | * | 3/1999 | Suemura et al. | ............ 375/365 |
| 6,124,993 A | * | 9/2000 | Hallamasek | .................. 360/48 |
| 6,901,550 B2 | * | 5/2005 | Adar et al. | .................. 714/762 |
| 2002/0009169 A1 | * | 1/2002 | Watanabe | .................... 375/371 |

* cited by examiner

*Primary Examiner*—Stephen M. Baker
(74) *Attorney, Agent, or Firm*—Katten Muchin Rosenman LLP

(57) ABSTRACT

A data transmission system which provides a better level of transmission quality, without being affected by skew variations. A serial-to-parallel converter reforms a serial data stream into a set of parallel data streams. A sync pattern inserter generates and inserts sync patterns to the parallel data streams. The resultant sync pattern-inclusive data streams are, however, distorted with some propagation delay skews when they arrive at the receiving end. A data retimer extracts a reference clock from one of the received data streams, and retimes all streams with that reference clock, thus producing a set of retimed data streams. An in-sync detector produces pulse signals indicating the presence of sync patterns in the retimed data streams and determines whether each of those streams is in in-sync state. A phase adjuster identifies the propagation delay skews by examining the pulse signals, and adjusts the phase of each data stream to eliminate them.

12 Claims, 22 Drawing Sheets

FIG. 15

DATA TRANSMISSION SYSTEM

BACKGROUND OF THE INVENTION

1. Field of the Invention

The present invention relates to a data transmission system, and more particularly to a data transmission system which transports data in parallel form.

2. Description of the Related Art

Increasingly large amounts of data have to be transferred and processed at higher speeds in today's computer systems including distributed computing environments. This is also true in communications systems. To meet the demands for greater bandwidths, many systems employ parallel data transfer methods, which use a plurality of signal lines simultaneously to transport information.

In parallel data transmission systems, the difference of propagation delay times between data bits is one of the major factors that determine the performance. This is known as the "skews." Since the presence of large skews makes it difficult to process incoming data signals correctly, the receivers are required to have a timing adjustment mechanism of some kind. Conventional systems thus employ delay circuits to compensate for data skews, so that all the parallel data bits will be aligned properly.

High-speed digital systems of today, however, must be able to handle signals that change their states in an extremely short time. Even a small variation in a signal's rise time and fall time would have a serious impact on the system's operation, as the transmission rate becomes higher and higher. That is, a slight irregular behavior of signal skews could cause serious adverse effects to data setup/hold time conditions of registers at the receiving end, leading to performance degradation of the system. The above-mentioned simple delay circuits used in conventional systems are not effective enough to correct such skews completely, and accordingly, there is an increasing demand for techniques that avoid transmission losses due to skew variations.

SUMMARY OF THE INVENTION

In view of the foregoing, it is an object of the present invention to provide a data transmission system which provides a better level of transmission quality, without being affected by skew variations.

To accomplish the above object, according to the present invention, there is provided a data transmission system which transports data in parallel form. This comprises a transmitter and a receiver. The transmitter comprises the following elements: a serial-to-parallel converter which converts a serial data stream into a set of parallel data streams; and a sync pattern inserter which generates a sync pattern and inserts the sync pattern to each of the parallel data streams, thereby producing sync pattern-inclusive data streams. The receiver, on the other hand, comprises the following elements: a data retimer which extracts a reference clock from one of the sync pattern-inclusive data streams and produces retimed data streams by retiming all the sync pattern-inclusive data streams with the extracted reference clock, the sync pattern-inclusive data streams having been distorted with propagation delay skews; an in-sync detector which produces pulse signals indicating the sync pattern present in each individual retimed data stream, and determines whether each retimed data stream is in in-sync state; and a phase adjuster which identifies the propagation delay skews by examining the pulse signals, and adjusts the phases of the retimed data streams to correct the propagation delay skews thereof.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 14 and 15 are a timing diagram showing how sync pattern-inclusive data streams are produced;

DESCRIPTION OF THE PREFERRED EMBODIMENTS

Figure 1:
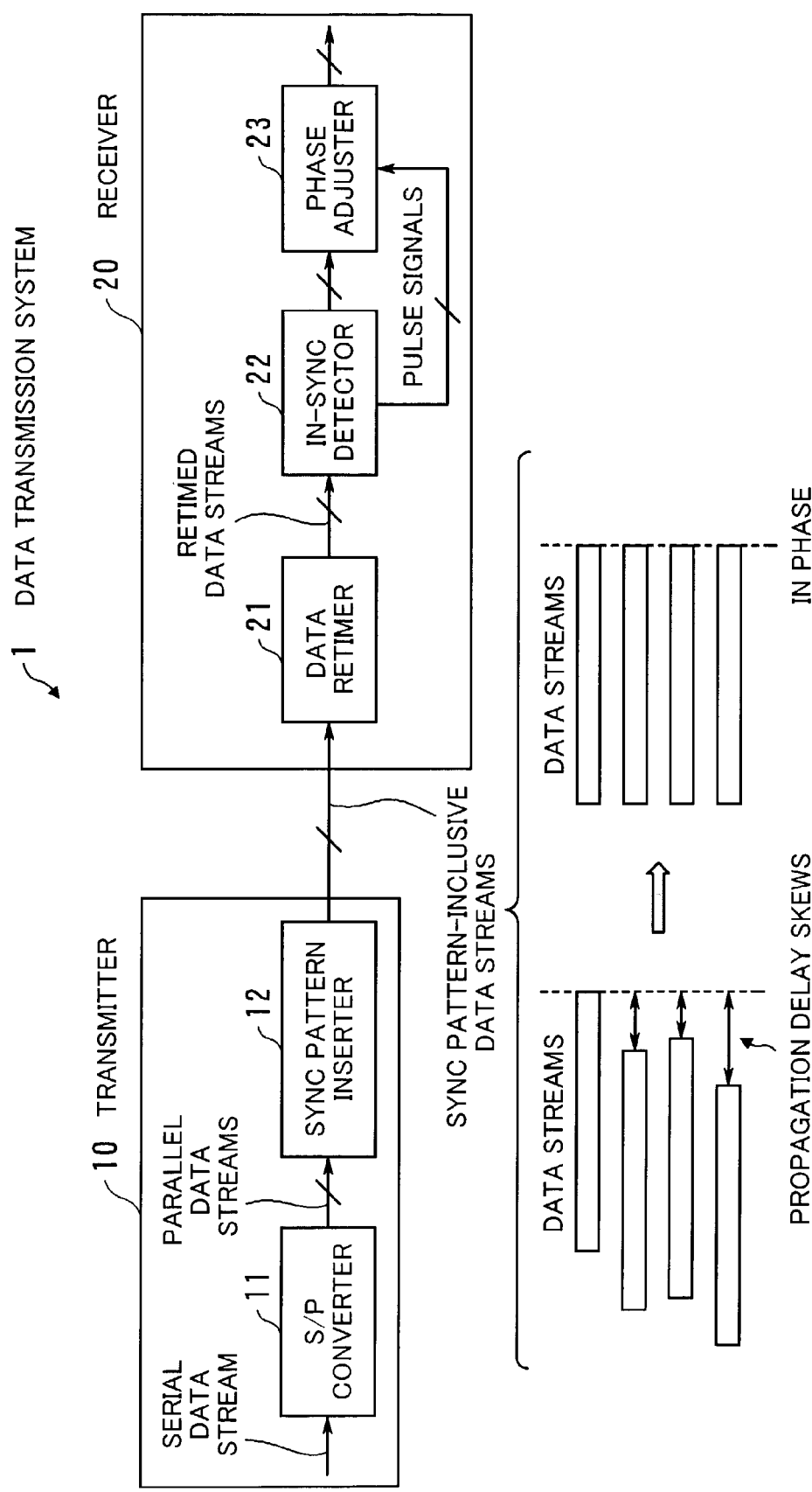
FIG. 1 is a conceptual view of a data transmission system according to a first embodiment of the present invention.

Preferred embodiments of the present invention will be described below with reference to the accompanying drawings, wherein like reference numerals refer to like elements throughout.

FIG. 1 is a conceptual view of a data transmission system according to a first embodiment of the present invention. The illustrated data transmission system 1 comprises a transmitter 10 and a receiver 20, between which data is transported in parallel form. The transmitter 10 has a serial-to-parallel (S/P) converter 11 and a sync pattern inserter 12. The S/P converter 11 converts a given serial data stream into a set of parallel data streams. The sync pattern inserter 12 generates a synchronization pattern which is a fixed sequence of values that are previously determined. The sync pattern inserter 12 inserts this synchronization pattern to each of the parallel data streams at specific intervals, thereby producing sync pattern-inclusive data streams. Note here that we use, where appropriate, the term "sync" as a shortened form of "synchronization."

The receiver 20 has a data retimer 21, an in-sync detector 22, and a phase adjuster 23. The data retimer 21 receives a plurality of sync pattern-inclusive data streams which may be distorted with some propagation delay skews. It extracts a reference clock from one of those sync pattern-inclusive data streams, and then retimes all individual data streams with that reference clock, thereby producing a set of retimed data streams. The in-sync detector 22 produces pulse signals that indicate the presence of sync patterns in each individual retimed data stream, and determines whether each retimed data stream is in in-sync state. The phase adjuster 23 identifies propagation delay skews between the retimed data streams by examining the pulse signals, and then adjusts the phase of each data stream, thus correcting their propagation delay skews. In the next section, we present a more specific example of the proposed data transmission system 1 and explain its operation, referring to it as the first embodiment of the present invention.

Figure 2:
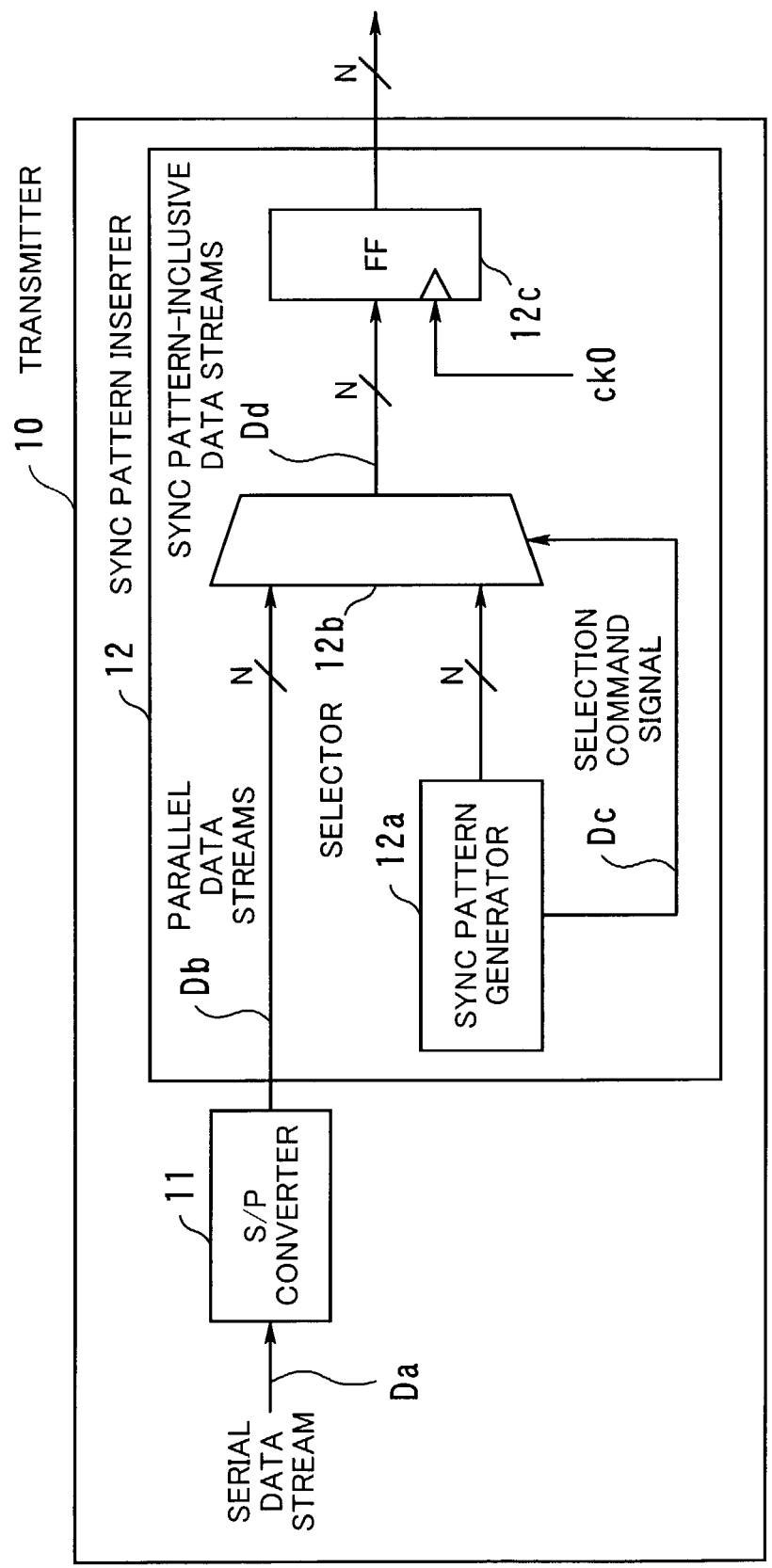
FIG. 2 shows the structure of a transmitter.
Figure 3:
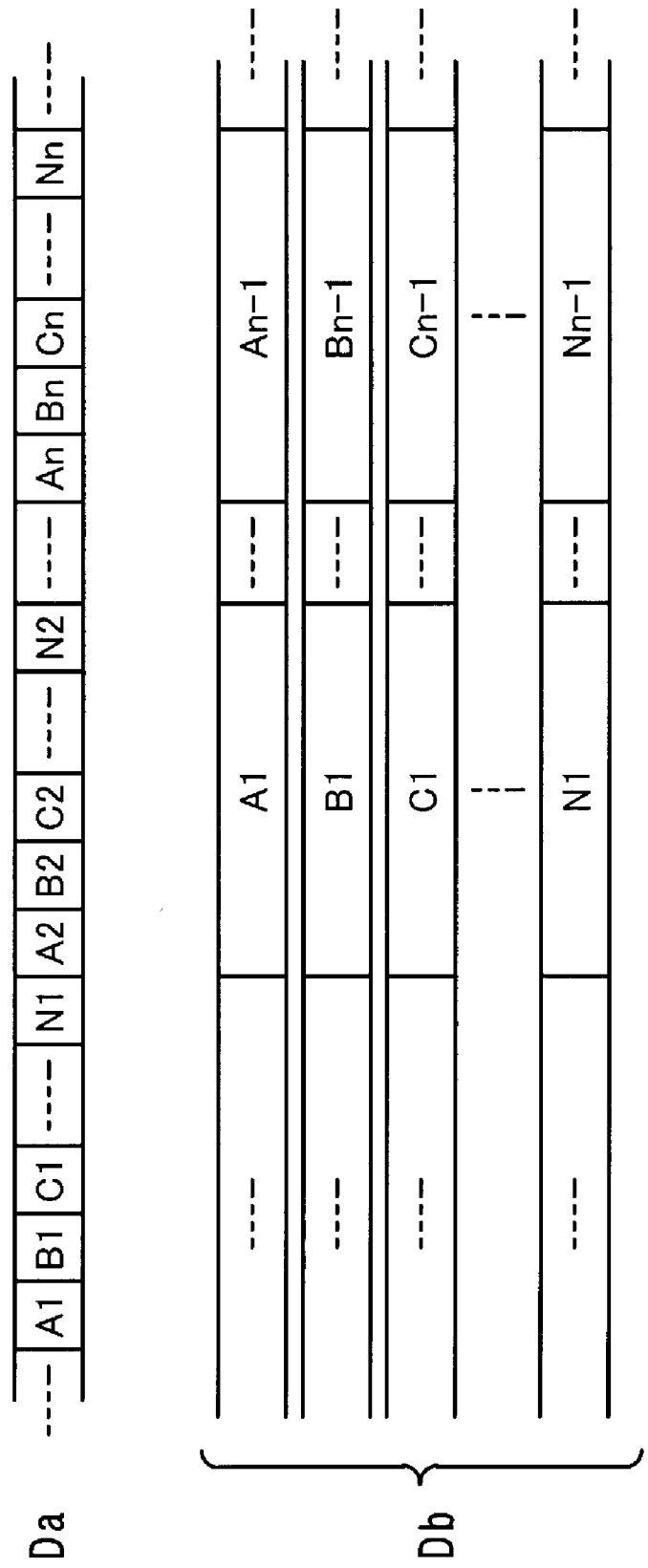
FIG. 3 is a timing diagram showing a process of serial-to-parallel conversion.
Figure 4:
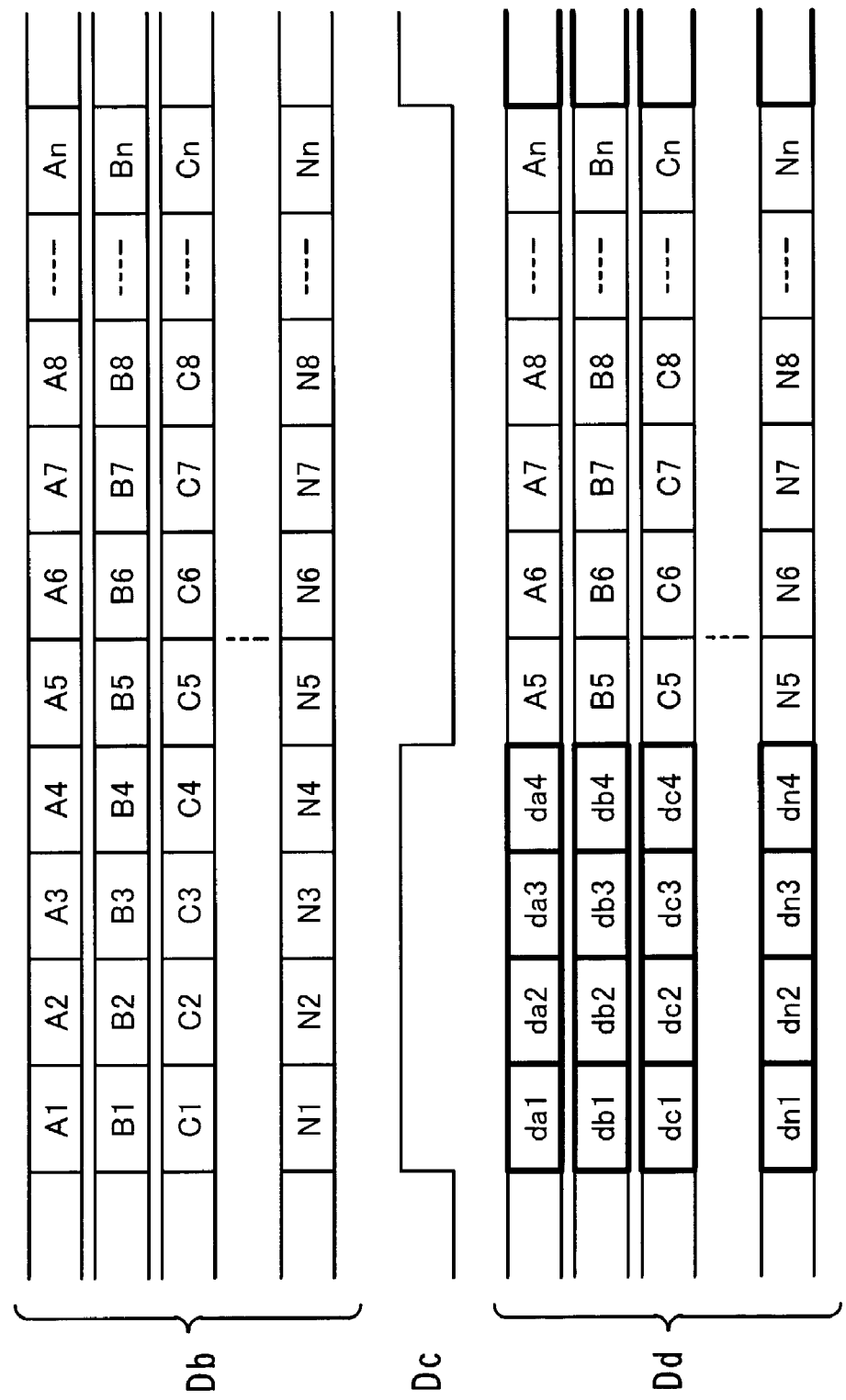
FIG. 4 is a timing diagram showing how sync pattern-inclusive data streams are produced.

Referring first to FIGS. 2 to 4, the structure and operation of the transmitter 10 will be described below. FIG. 2 is a block diagram of the transmitter 10. As mentioned earlier, the transmitter 10 has an S/P converter 11 and a sync pattern inserter 12. FIG. 2 shows that the sync pattern inserter 12 is composed of a sync pattern generator 12a, a selector 12b, and flip-flops (FF) 12c.

FIG. 3 is a timing diagram showing a process of serial-to-parallel conversion. Here, the S/P converter 11 performs 1:N serial-to-parallel conversion; i.e., it converts a single high-speed serial data stream Da into N-bit parallel data streams Db.

FIG. 4 is a timing diagram that explains how sync pattern-inclusive data streams are produced. More specifically, FIG. 4 depicts a process where a four-clock (or four-bit) synchronization pattern is inserted (overwritten) to each of the parallel data streams Db. Referring back to FIG. 2, the selector 12b is designed to do this by selecting the sync pattern when a given selection command signal Dc is "H" (high level) and outputting the parallel data streams Db when the signal Dc is "L" (low level). In the example of FIG. 4, the selection command signal Dc becomes "H" during the first four-bit period of the parallel data streams Db (i.e., A1–A4, B1–B4, C1–C4, . . . , N1–N4). This selection command signal Dc causes the selector 12b to insert the sync pattern data (da1–da4, db1–db4, dc1–dc4, . . . , dn1–dn4) to corresponding data streams, thus yielding a set of sync pattern-inclusive data streams Dd. Referring again to FIG. 2, the resultant sync pattern-inclusive data streams Dd are sent out of the transmitter 10 via the flip-flops 12c, which sample their inputs at every active edge of a given clock signal ck0.

Figure 5:
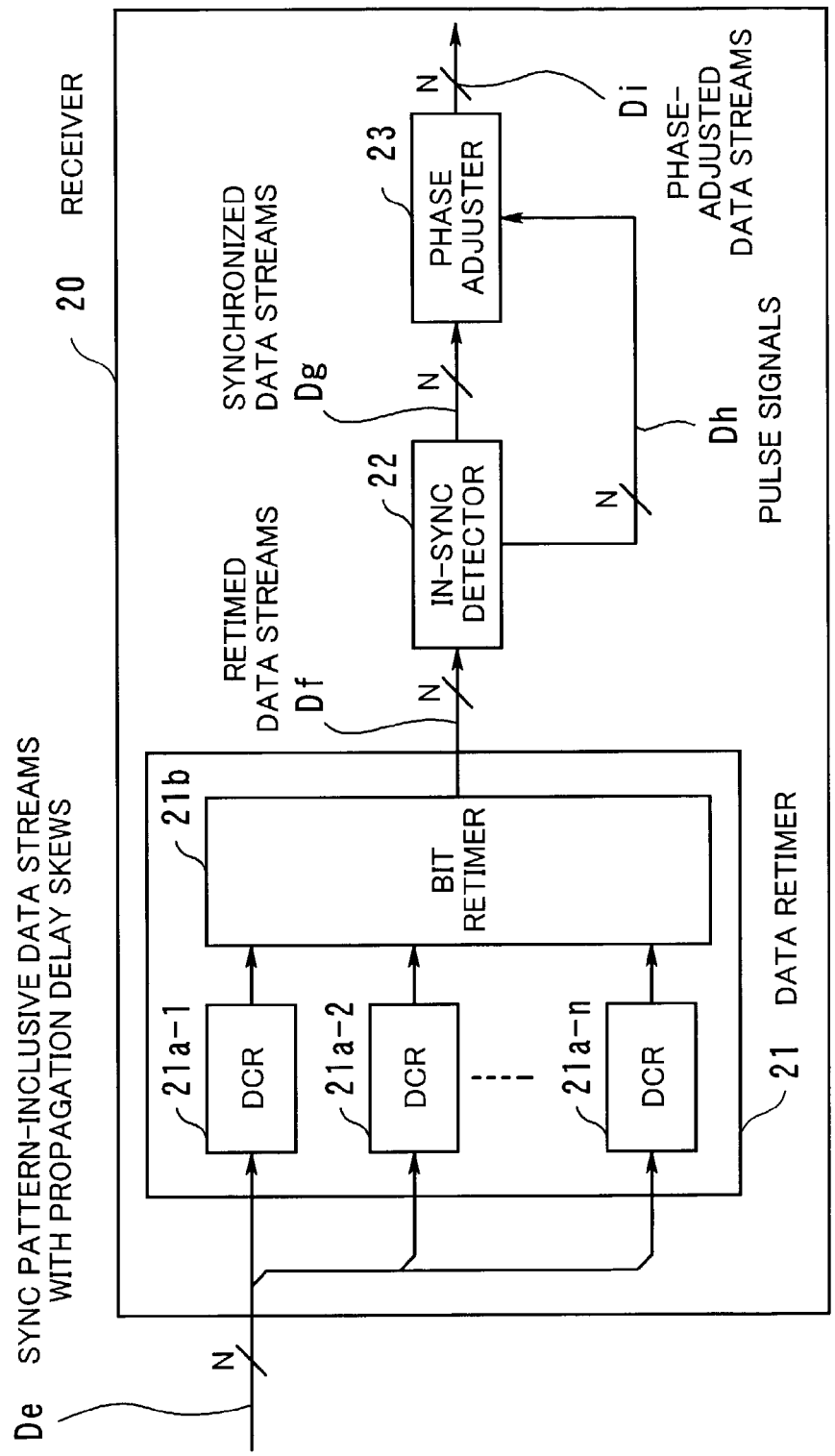
FIG. 5 shows the structure of a receiver.
Figure 6:
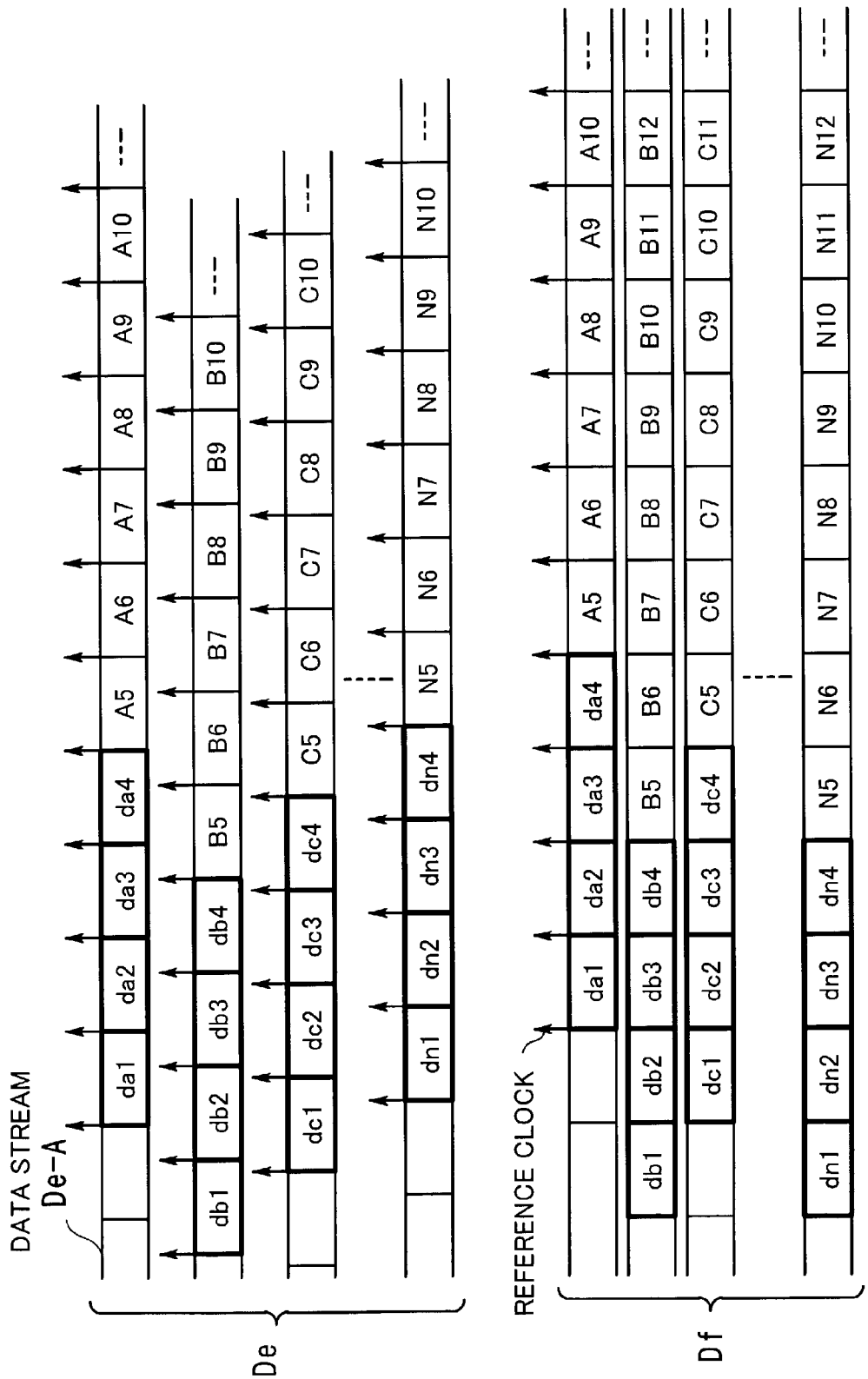
FIG. 6 is a timing diagram showing a data retiming process.
Figure 7:
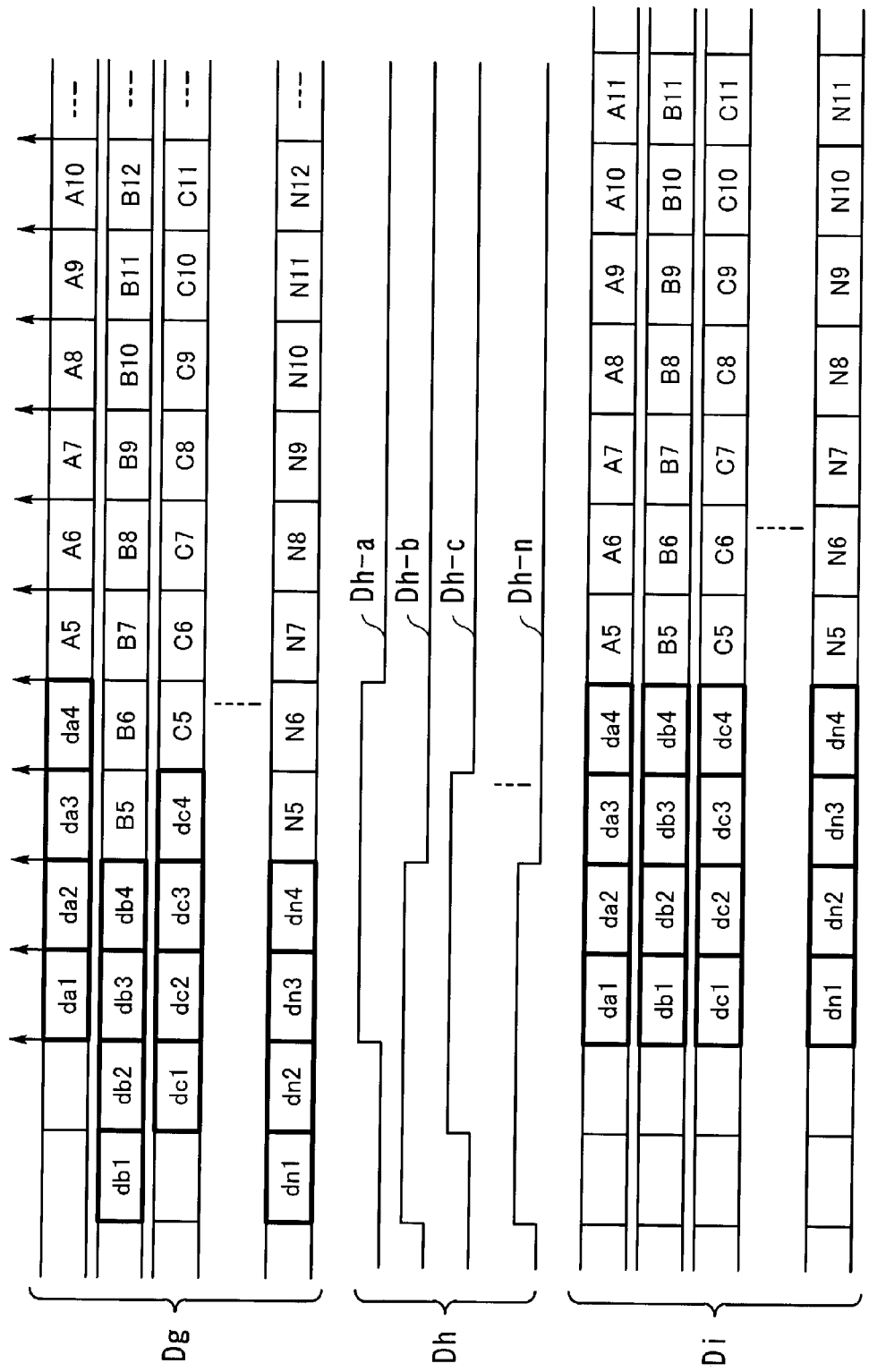
FIG. 7 is a timing diagram showing a process of phase adjustment of parallel data streams.

Referring next to FIGS. 5 to 7, the structure and operation of the receiver 20 will be described below. FIG. 5 is a block diagram of the receiver 20. The receiver 20 has a data retimer 21, an in-sync detector 22, and a phase adjuster 23. The data retimer 21 is composed of a plurality of digital clock recovery (DCR) units 21a-1 to 21a-n and a bit retimer 21b.

FIG. 6 is a timing diagram showing a data retiming process. As seen, the sync pattern-inclusive data streams De arriving at the receiver 20 have been added different delays during their travel from the transmitter 10. The upward arrows in FIG. 6 represent clock components included in the data streams.

The DCR units 21a-1 to 21a-n (FIG. 5) extract clock components from each given sync pattern-inclusive data stream De and supply them to the bit retimer 21b, together with the data streams themselves. The bit retimer 21b retimes all individual data streams in a bit-by-bit manner, using one of the extracted clocks as the reference clock. The resulting retimed data streams Df, therefore, are all in synchronization with that reference clock. Suppose that, in the example of FIG. 6, the clock component of the first sync pattern-inclusive data stream De-A is selected as the reference clock.

FIG. 7 is a timing diagram showing a process of phase adjustment of parallel data streams. The in-sync detector 22 recognizes the state of each retimed data stream Df and outputs them as synchronized data streams Dg, which appear the same as the retimed data streams Df in FIG. 6. To this end, the in-sync detector 22 (FIG. 5) contains a multiple-stage synchronization checking mechanism that indicates the establishment of synchronization (hence "in-sync" state) if a given data stream passes a predetermined number of checking stages.

The in-sync detector 22 (FIG. 5) also produces pulse signals Dh each associated with the synchronized data streams Dg, indicating the presence of a sync pattern in each data stream. The pulse signals Dh, while being "L" in normal state, are asserted to "H" during the period of every sync pattern that is found in their corresponding synchronized data streams Dg. In the example of FIG. 7, the individual pulse signals Dh-a, Dh-b, Dh-c, . . . , and Dh-n become active ("H") during the periods of da1–da4, db1–db4, dc1–dc4, . . . , and dn1–dn4, respectively. The phase adjuster 23 (FIG. 5) tests the state of those pulse signals Dh-a, Dh-b, Dh-c, . . . , and Dh-n to determine how much propagation delay skew is present in each of the synchronized data streams Dg. The phase adjuster 23 then adjusts their phases in reference to, for example, the first pulse signal Dh-a, thus producing skew-free, phase-adjusted data streams Di.

As seen from the above explanation, the proposed data transmission system 1 is configured to insert sync patterns to parallel data streams at the transmitter 10, so that sync pattern-inclusive data streams are produced. The receiver 20 retimes incoming data streams with reference to an appropriate reference clock, thereby producing retimed data streams. The receiver 20 then generates pulse signals representing sync patterns contained in the data streams, for use in correcting their phase differences. In this way, the present invention prevents transmission signals from being degraded by their skew variations, thus providing a better level of transmission quality.

Figure 8:
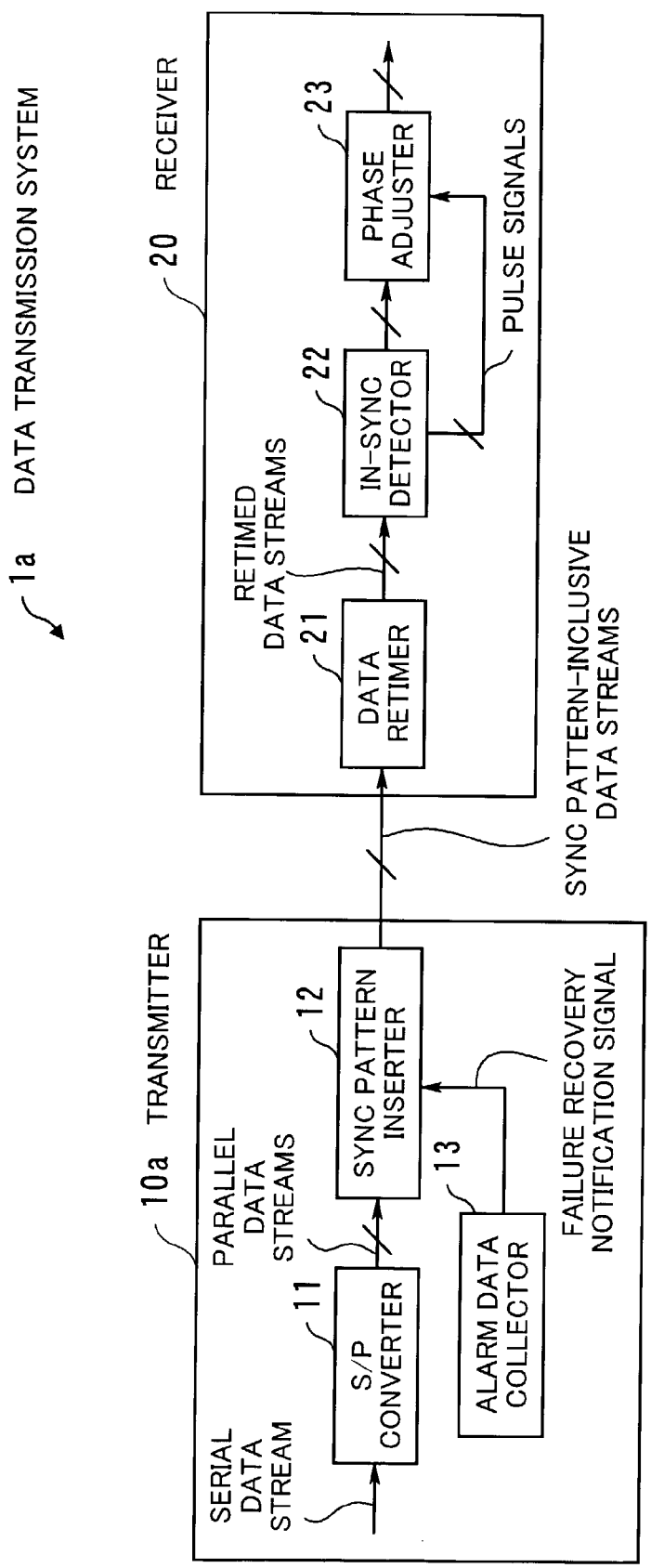
FIG. 8 shows the structure of a data transmission system according to a second embodiment of the present invention.

Referring now to FIG. 8, a second embodiment of the present invention will be described below. FIG. 8 shows the structure of a data transmission system 1a, including a transmitter 10a, according to the second embodiment. This system 1a is similar to the first embodiment described earlier, except that the transmitter 10a has an alarm data collector 13.

The alarm data collector 13 collects information about service failure at the sending end. When it learns from such information that the transmitter 10a has recovered from a certain failure, the alarm data collector 13 so notifies the sync pattern inserter 12 by sending a failure recovery notification signal. Upon receipt of this signal, the sync pattern inserter 12 raises the frequency of sync pattern insertion for a predetermined period immediately after the failure recovery. For example, it inserts sync patterns at the intervals of 20 clocks during that period, whereas it usually inserts them at the intervals of 100 clocks.

The above-described control feature in the second embodiment permits the receiver 20 to re-establish the synchronization in a shorter time after the system's recovery from failure. This is because the data retimer 21 can find sync patterns faster, and thus the phase adjuster 23 can quickly correct the phases.

Figure 9:
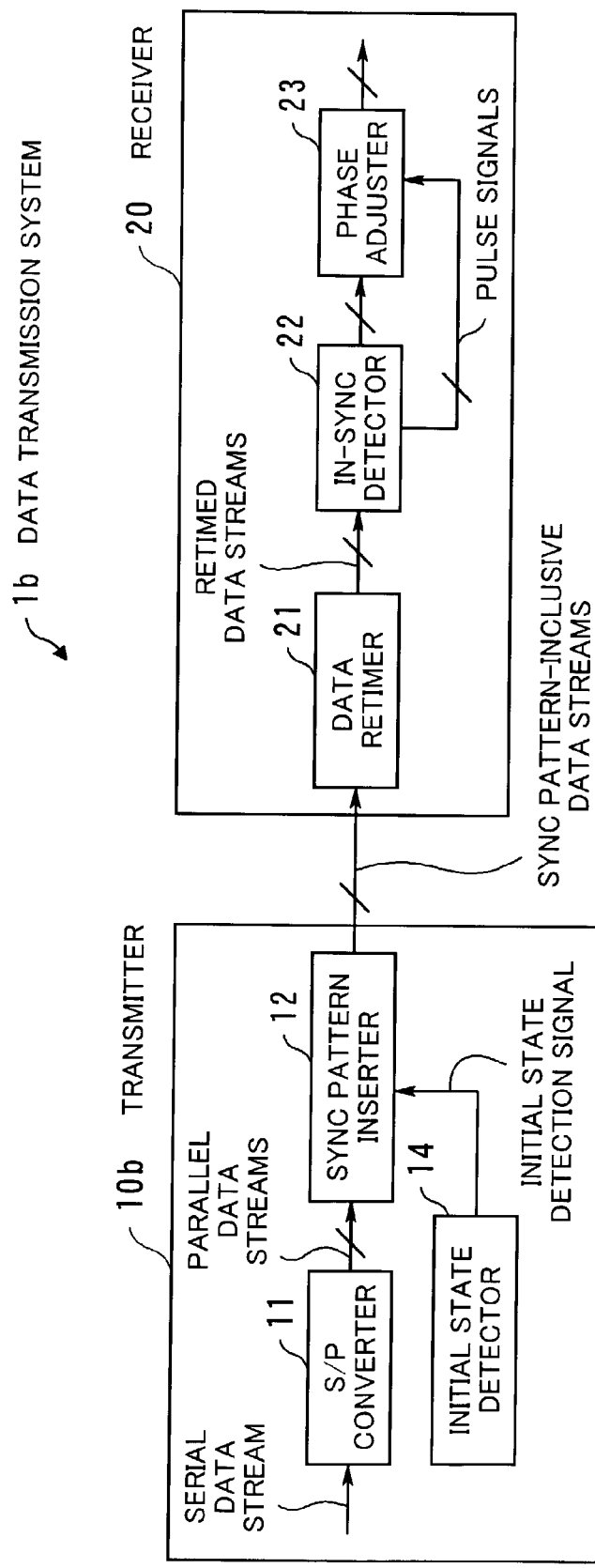
FIG. 9 shows the structure of a data transmission system according to a third embodiment of the present invention.

Referring next to FIG. 9, a third embodiment of the present invention will be described below. FIG. 9 shows the structure of a data transmission system 1b, including a transmitter 10b, according to the third embodiment. This system 1b is similar to the first embodiment, except that the transmitter 10b has an initial state detector 14.

The initial state detector 14 identifies the initial state of the transmitter 10b when it starts up, and it so notifies the sync pattern inserter 12 by asserting an initial state detection signal. Upon receipt of this signal, the sync pattern inserter 12 raises the frequency of sync pattern insertion for a predetermined period immediately after the initial state detection. This control feature of the third embodiment permits the in-sync detector 22 in the receiver 20 to establish synchronization in a shorter time at the initial stage of the system's start-up.

Figure 10:
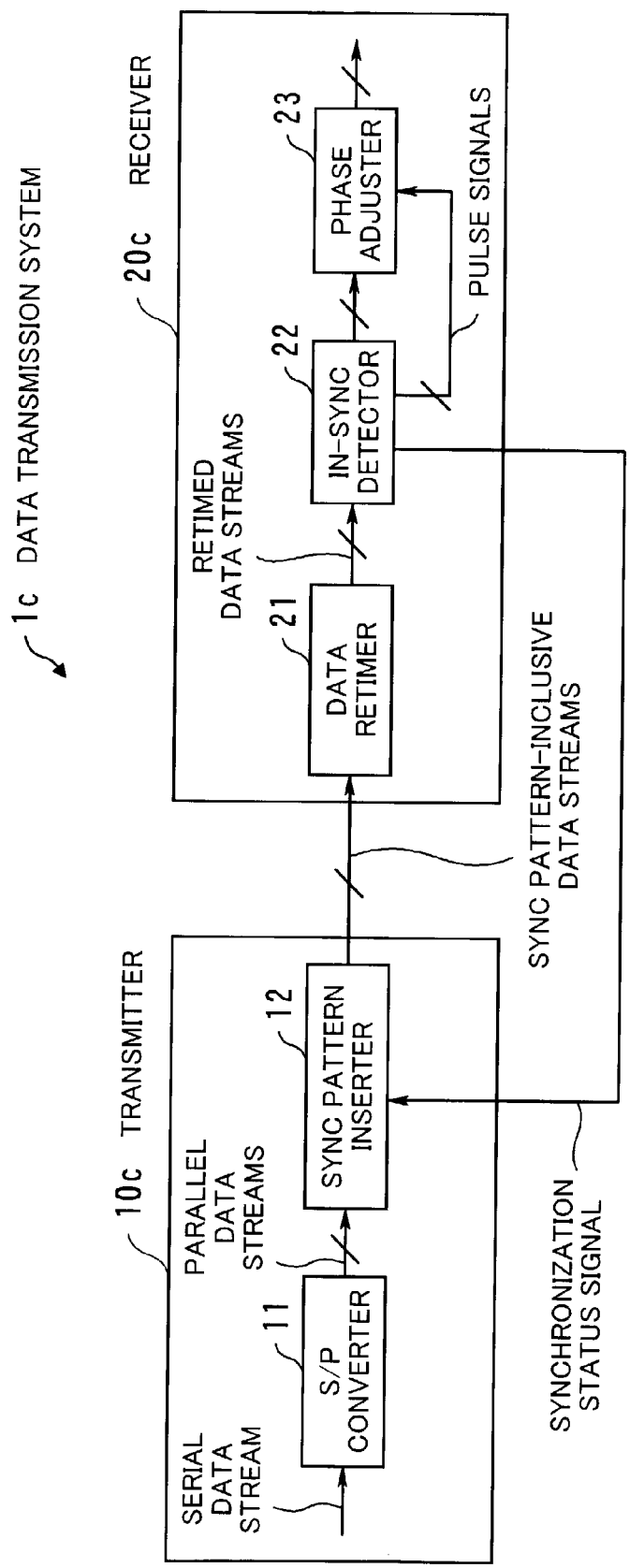
FIG. 10 shows the structure of a data transmission system according to a fourth embodiment of the present invention.

Referring next to FIG. 10, a fourth embodiment of the present invention will be described below. FIG. 10 shows the structure of a data transmission system 1c according to the fourth embodiment. This system 1c differs from the preceding ones in that its receiver 20c and transmitter 10c share the synchronization status information on the parallel data streams. That is, the in-sync detector 22 provides the sync pattern inserter 12 with a synchronization status signal that indicates whether the incoming data streams are in in-sync state or out-of-sync state. Given the synchronization status signal, the sync pattern inserter 12 varies the frequency of sync pattern insertion. More specifically, the sync pattern inserter 12 inserts sync patterns at a low rate (e.g., one for every 100 clocks) when the synchronization status signal indicates in-sync state. The sync pattern inserter 12, however, raises it to a high rate (e.g., one for every 20 clocks) when that signal indicates out-of-sync state.

As seen from the above, the fourth embodiment is designed to insert sync patterns at a low rate when the data transmission is in in-sync state, and at a high rate in out-of-sync state. This arrangement makes it possible to control phase adjustment processes more flexibly.

Figure 11:
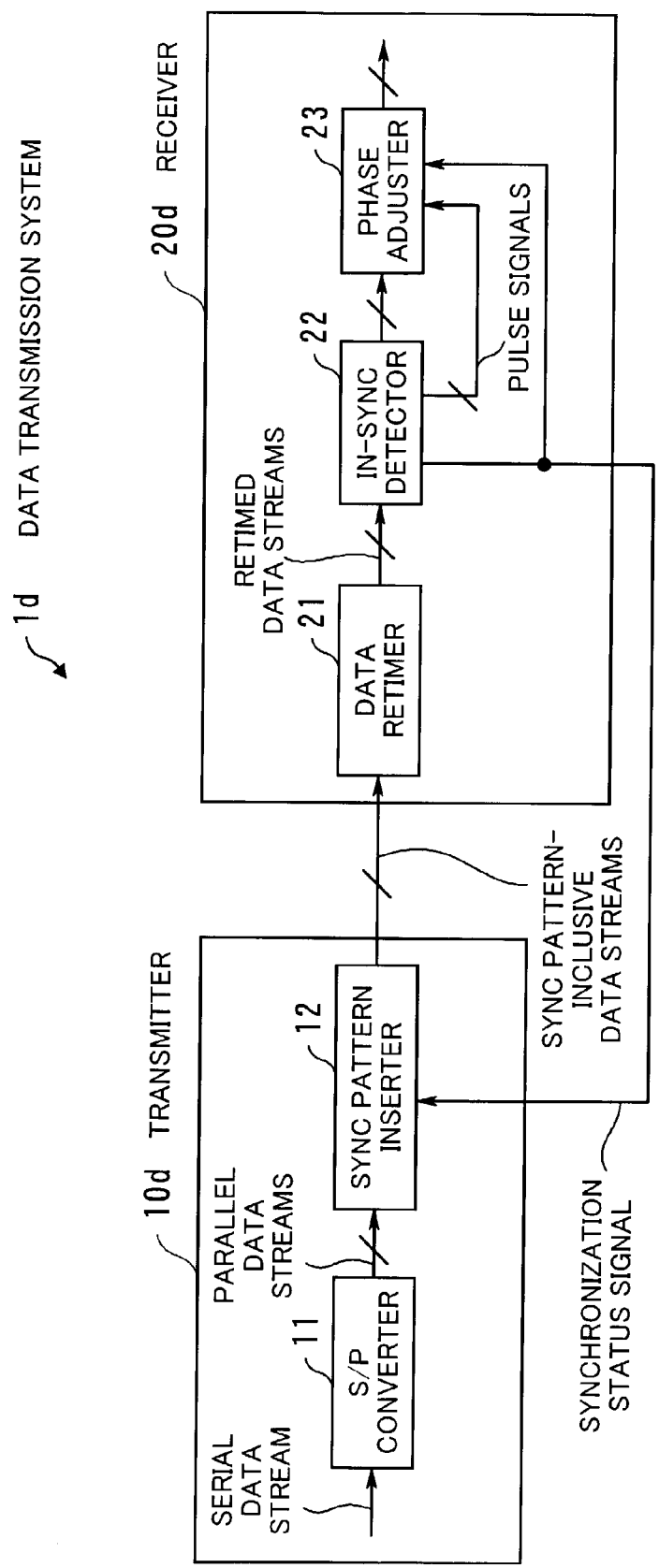
FIG. 11 shows the structure of a data transmission system according to a fifth embodiment of the present invention.

Referring next to FIG. 11, a fifth embodiment of the present invention will be described below. FIG. 11 shows the structure of a data transmission system 1d, including a transmitter 10d and receiver 20d, according to the fifth embodiment. This system 1d differs from the preceding ones in that the in-sync detector 22 in the receiver 20d supplies a synchronization status signal not only to the sync pattern inserter 12 in the transmitter 10d, but also to the phase adjuster 23 in the receiver 20d. The synchronization status signal indicates whether the incoming data streams are in in-sync state or out-of-sync state.

The sync pattern inserter 12 and phase adjuster 23 receive and check the synchronization status signal to ensure that all data streams are in in-sync state. The sync pattern inserter 12 then stops insertion of sync patterns (specifically, its integral sync pattern generator 12d is configured as such), and the phase adjuster 23 stops further adjustment of data stream phases. In this way, the data transmission system 1d of the fifth embodiment stops some control functions of the sync pattern inserter 12 and phase adjuster 23, once the synchronization is reached across the transmission line, and all incoming data streams are in phase with each other at the receiving end. This arrangement reduces the power consumption of the system.

Figure 12:
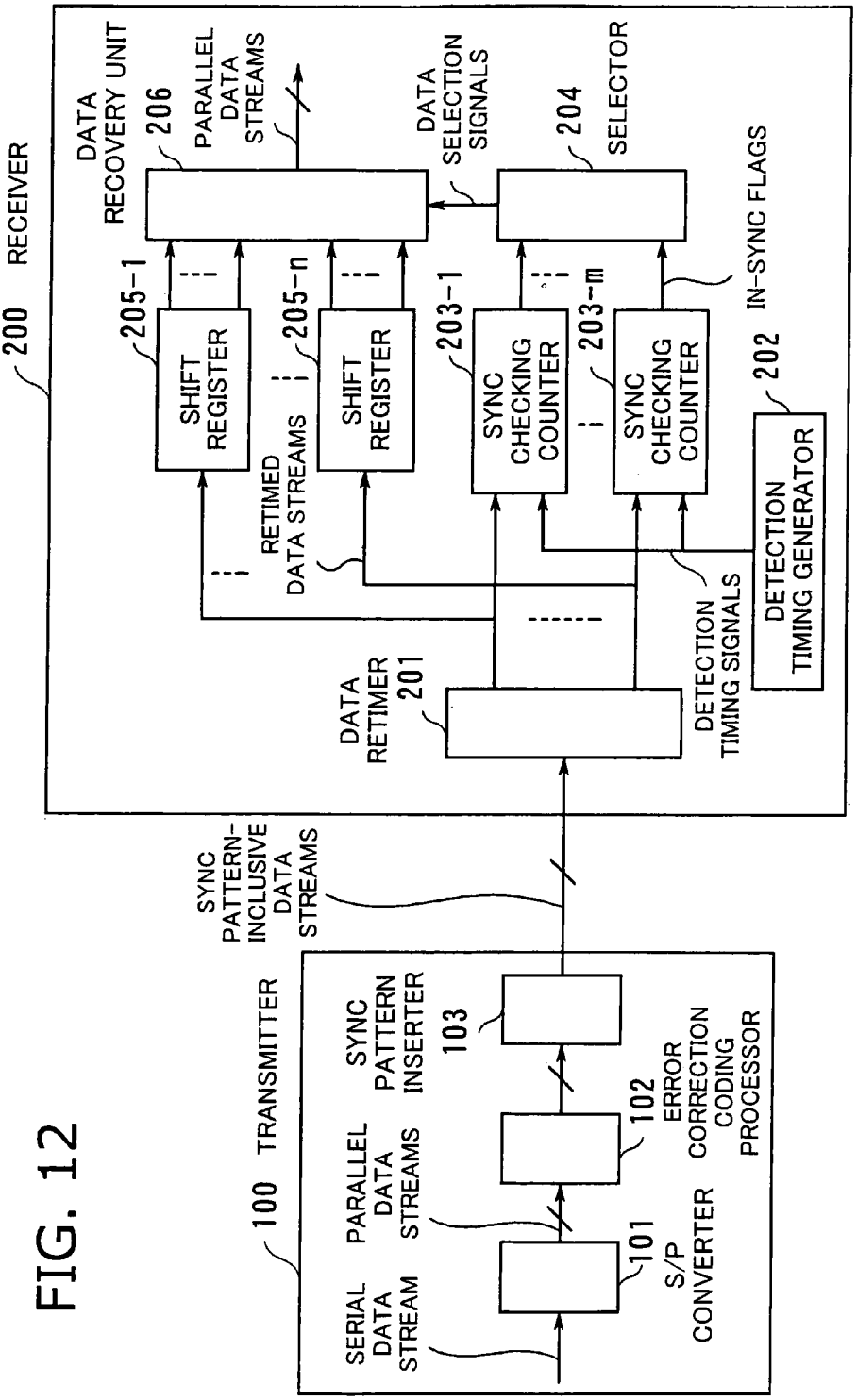
FIG. 12 shows a more specific structure of a data transmission system according to the present invention.

We will now present a more specific implementation of the present invention in the subsequent sections. FIG. 12 shows the structure of a data transmission system 1—1 according to the present invention, which comprises a transmitter 100 and a receiver 200. The transmitter 100 has an S/P converter 101, an error correction coding processor 102, and a sync pattern inserter 103. The S/P converter 101 converts a given serial data stream into a set of parallel data streams. The error correction coding processor 102 applies forward error correction (FEC) coding to those parallel data streams. The sync pattern inserter 103 inserts error correction codes (the result of the FEC operations) and sync patterns to the parallel data streams, thus producing sync pattern-inclusive data streams.

The receiver 200, on the other hand, has a data retimer 201, a detection timing generator 202, a plurality (m) of sync checking counters 203-1 to 203-m, a selector 204, a plurality (n) of shift registers 205-1 to 205-n, and a data recovery unit 206.

The data retimer 201 extracts a reference clock from one of the sync pattern-inclusive data streams, which may be distorted with some propagation delay skews. Using the extracted reference clock, it retimes all individual data streams, thus producing a set of retimed data streams.

The detection timing generator 202 generates detection timing signals for use in detecting sync patterns in the retimed data streams. The sync checking counters 203-1 to 203-m compare the phase of each detected sync pattern with that of the detection timing signal. When phase matches are consecutively observed a predetermined number of times, the sync checking counters 203-1 to 203-m set their respective in-sync flags to indicate the in-sync state of each data stream.

The selector 204 produces data selection signals, based on the combination of the in-sync flags being set. The shift registers 205-1 to 205-n adds stepwise delays to the retimed data streams, thereby producing various phase-shifted versions of each. The resultant data are referred to as "phase-shifted data streams." From among those phase-shifted data streams, the data recovery unit 206 selects a set of data streams that are in phase with each other, according to the data selection signals supplied from the selector 204. It then checks the integrity of the data content by using the error correction algorithm, and corrects them if any error is found. In this way, the data recovery unit 206 reconstructs the original parallel data streams at the receiving end.

Figure 13:
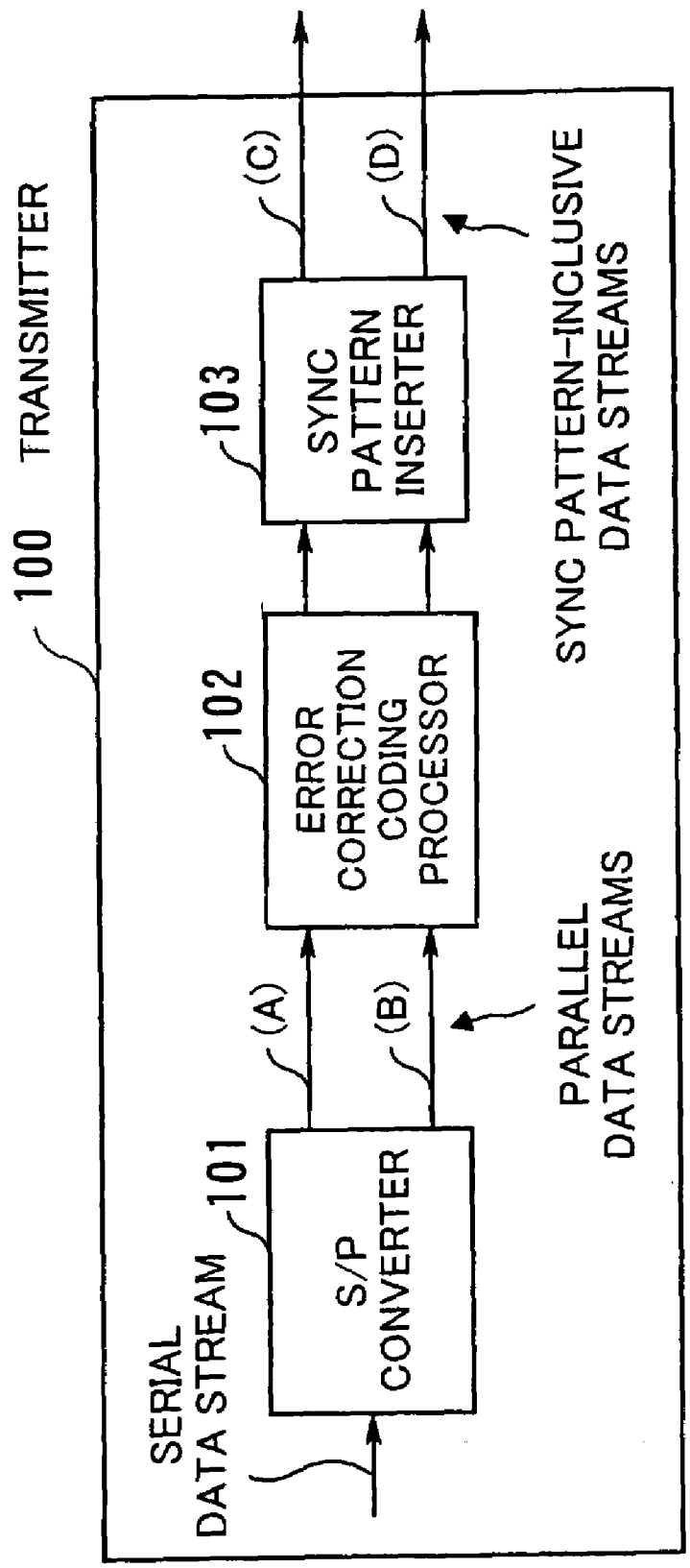
FIG. 13 shows the structure of the transmitter shown in FIG. 12.
Figure 14:
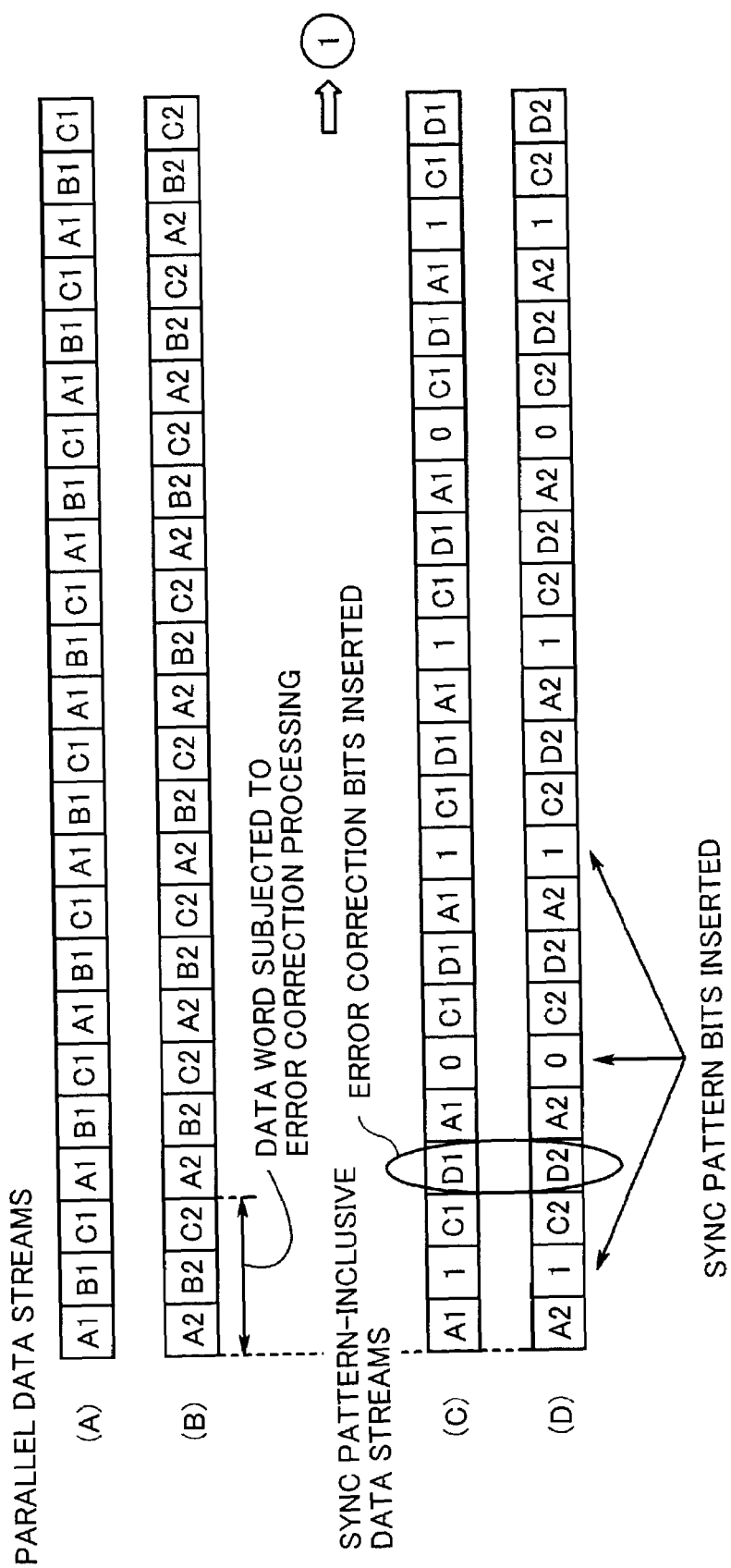
Figure 15:
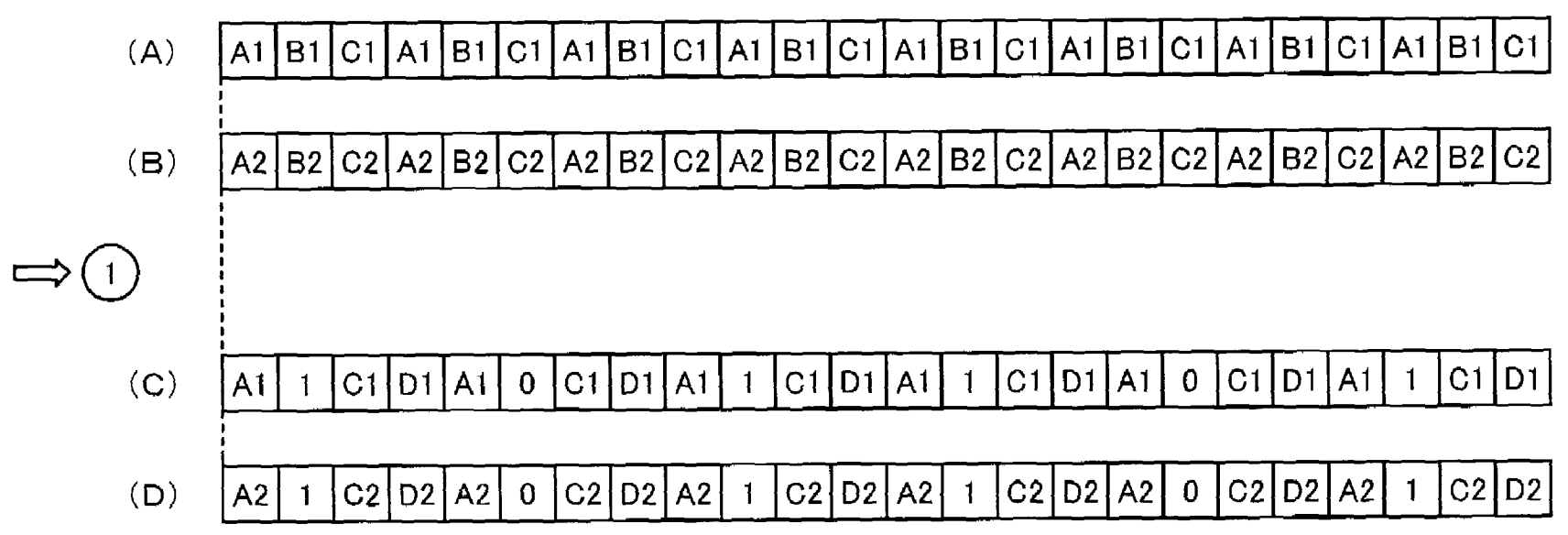

The operation of the above-described data transmission system 1—1 will now be described below, assuming an implementation for two-bit parallel data transmission with three-bit error correction capabilities. Referring first to FIGS. 13 to 15, our explanation starts with the operation of the transmitter 100.

FIG. 13 shows the structure of the transmitter 100, whose elements are the same as those in FIG. 12. FIGS. 14 and 15 are timing diagrams showing a process of producing sync pattern-inclusive data streams, where the symbols "A1," "B1," "C1," "A2," "B2," and "C2" represent individual data bits. In the context of FIG. 13, the S/P converter 101 performs 1:2 serial-to-parallel conversion, reformatting a given serial data stream into two parallel data streams (A) and (B). The error correction coding processor 102 is configured to process every three bits "A1," "B1," and "C1" as a single data word to which a small code will be added for the purpose of later error detection and correction for the first data stream (A). Similarly, it processes "A2," "B2," and "C2" as a data word for the second data stream (B). That is, the error correction coding processor 102 calculates an error correction code for each of these data words and places the results, D1 and D2, in their respective slots shown in FIGS. 14 and 15. Note, however, that appropriate measures (e.g., raising the clock rate) should be taken for the data streams to accommodate those additional bits.

The sync pattern inserter 103 (FIG. 13) inserts a sync pattern, one bit per data word. More specifically, the sync pattern is a three-bit pattern "101," which is inserted to every three consecutive data words in a distributed manner. In the present example, the slots B1 and B2 are overwritten with those sync pattern bits. The above processing yields two sync pattern-inclusive data streams (C) and (D), which are sent out of the transmitter 100.

It should be noted here that the interval of sync patterns has to be determined in relation to how large temporal slippage of data bits could occur. That is, the sync pattern interval should be larger than any possible slippage, because otherwise the system would be more likely to catch a sync pattern erroneously, resulting in an incorrect adjustment of data stream phases. In the present example, each sync pattern "101" spans a period of nine clocks, from the first "1" to the last "1."

Figure 16:
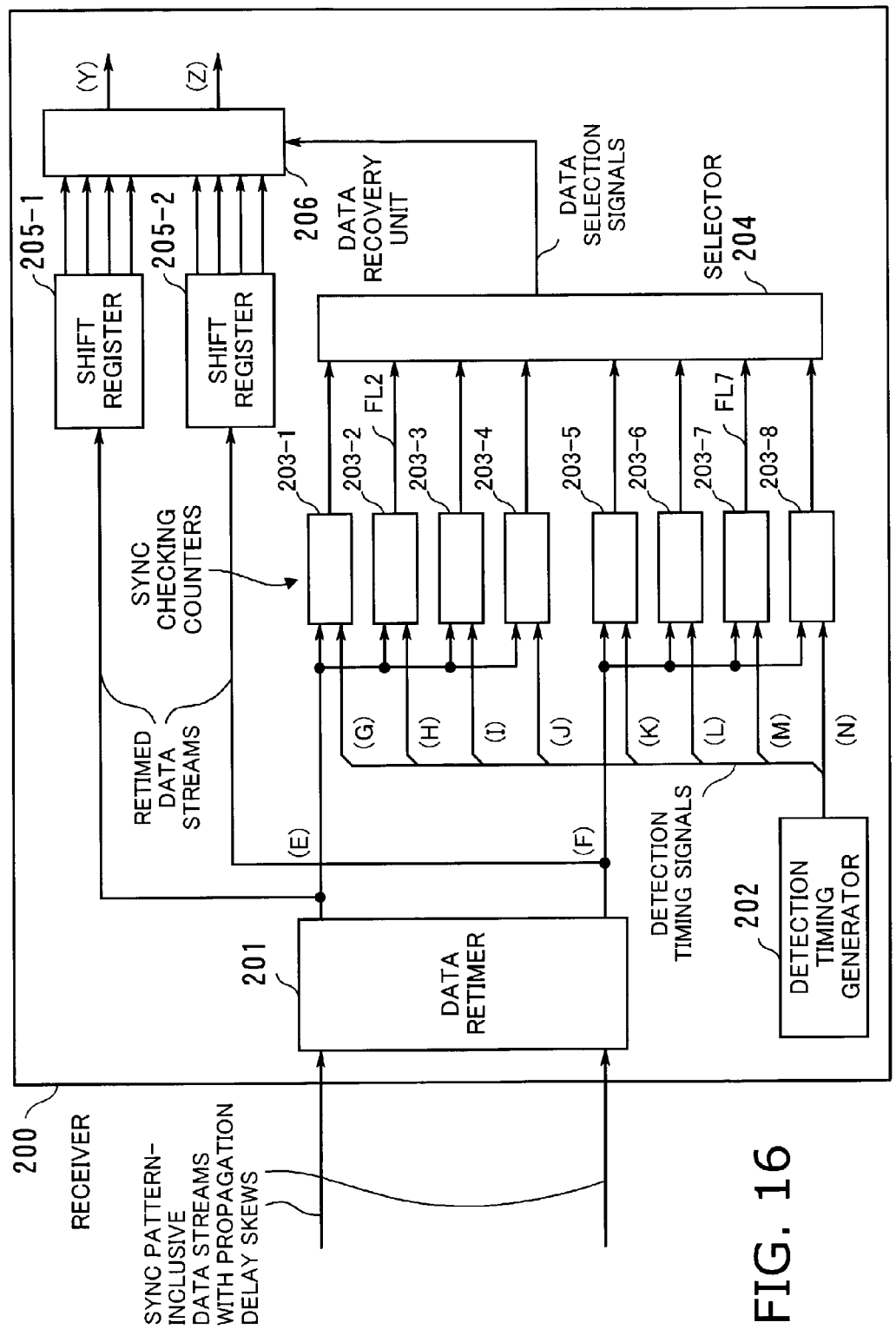
FIG. 16 shows the structure of the receiver shown in FIG. 12.
Figure 17:
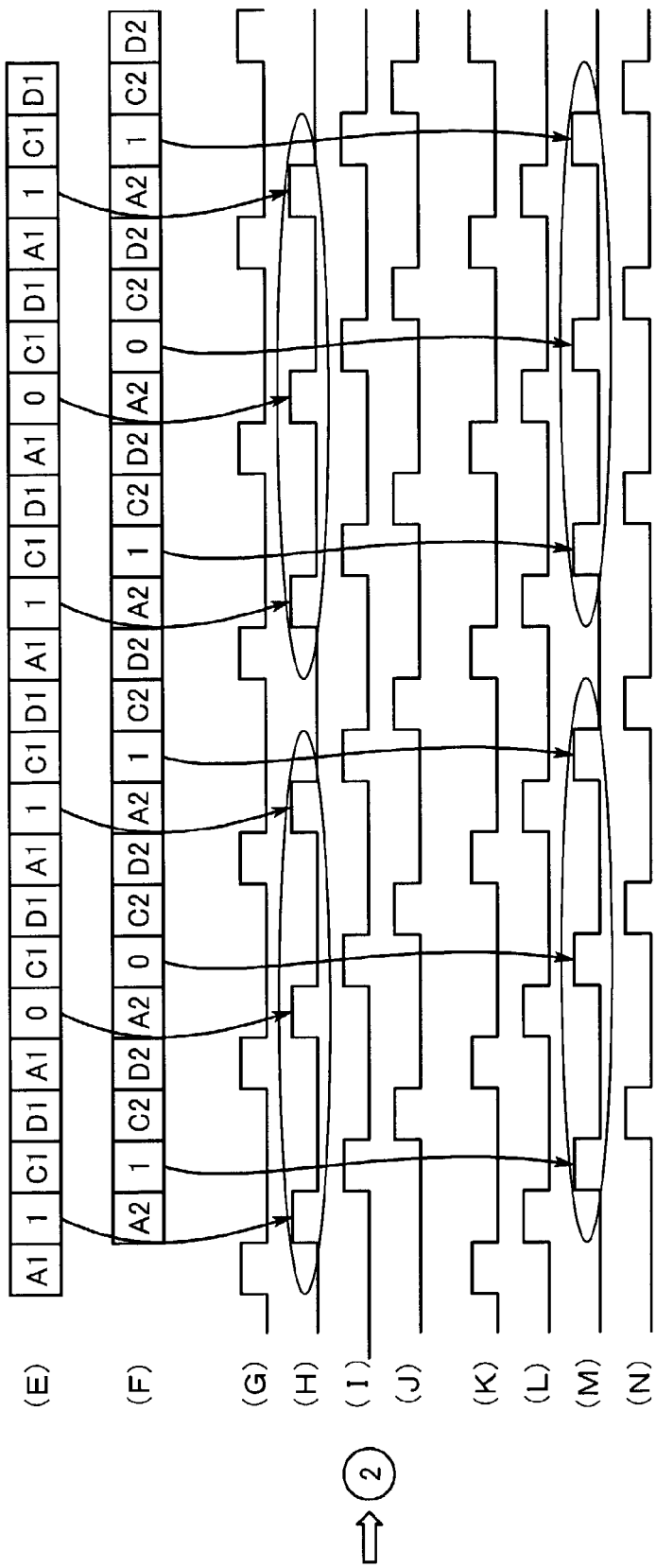
FIGS. 17 and 18 are a timing diagram showing sync pattern-inclusive data streams and detection timing signals.
Figure 18:
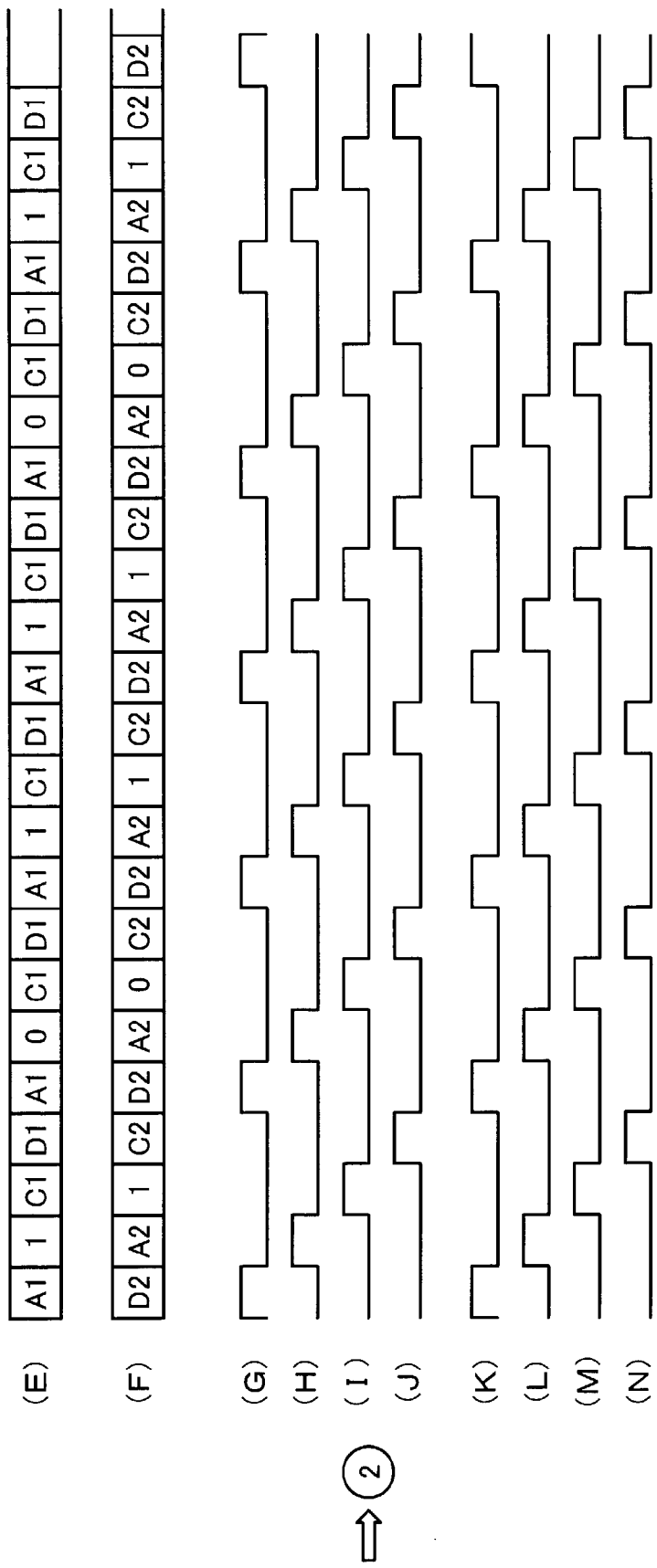

Referring next to FIGS. 16 to 22, the operation of the proposed receiver 200 will be explained. FIG. 16 shows the structure of the receiver 200, whose elements are the same as those explained earlier in FIG. 12. FIGS. 17 and 18 are timing diagrams showing sync pattern-inclusive data streams and detection timing signals.

The output data streams of the transmitter 100 travel over the transmission lines and finally reach the receiver 200. At that point, however, the data streams have lost their initial phase alignment because of the propagation delay skews. The data retimer 201 retimes such data streams at the front end of the receiver 200, by applying the process described earlier in the first embodiment. In the example of FIG. 16, the symbols (E) and (F) represent the resultant retimed data streams.

Aside from the data retiming, the detection timing generator 202 produces a set of detection timing signals for use in detecting sync patterns contained in the received data streams. The number $N_{DET}$ of detection timing signals required for this purpose is calculated as follows:

$$N_{DET} = N_{STREAM} \times (N_{DW} + N_{ECC})$$

where $N_{STREAM}$ is the number of data streams being transmitted in parallel, $N_{DW}$ is the number of data bits constituting a data word for error correction coding, and $N_{ECC}$ is the number of error correction code bits. The detection timing generator 202 in the present example produces eight signals since $N_{DET} = 2 \times (3+1) = 8$.

FIGS. 17 and 18 shows one set of detection timing signals (G) to (J) for detecting a sync pattern "101" in the first retimed data stream (E), and another set of detection timing signals (K) to (N) for detecting a sync pattern "101" in the second retimed data stream (F). Sync patterns are supposed to be in phase with either of those detection timing signals. In the present example, the sync pattern in the first retimed data stream (E) matches with one detection timing signal (H), while that in the second retimed data stream (F) matches with another detection timing signal (M).

Figure 19:
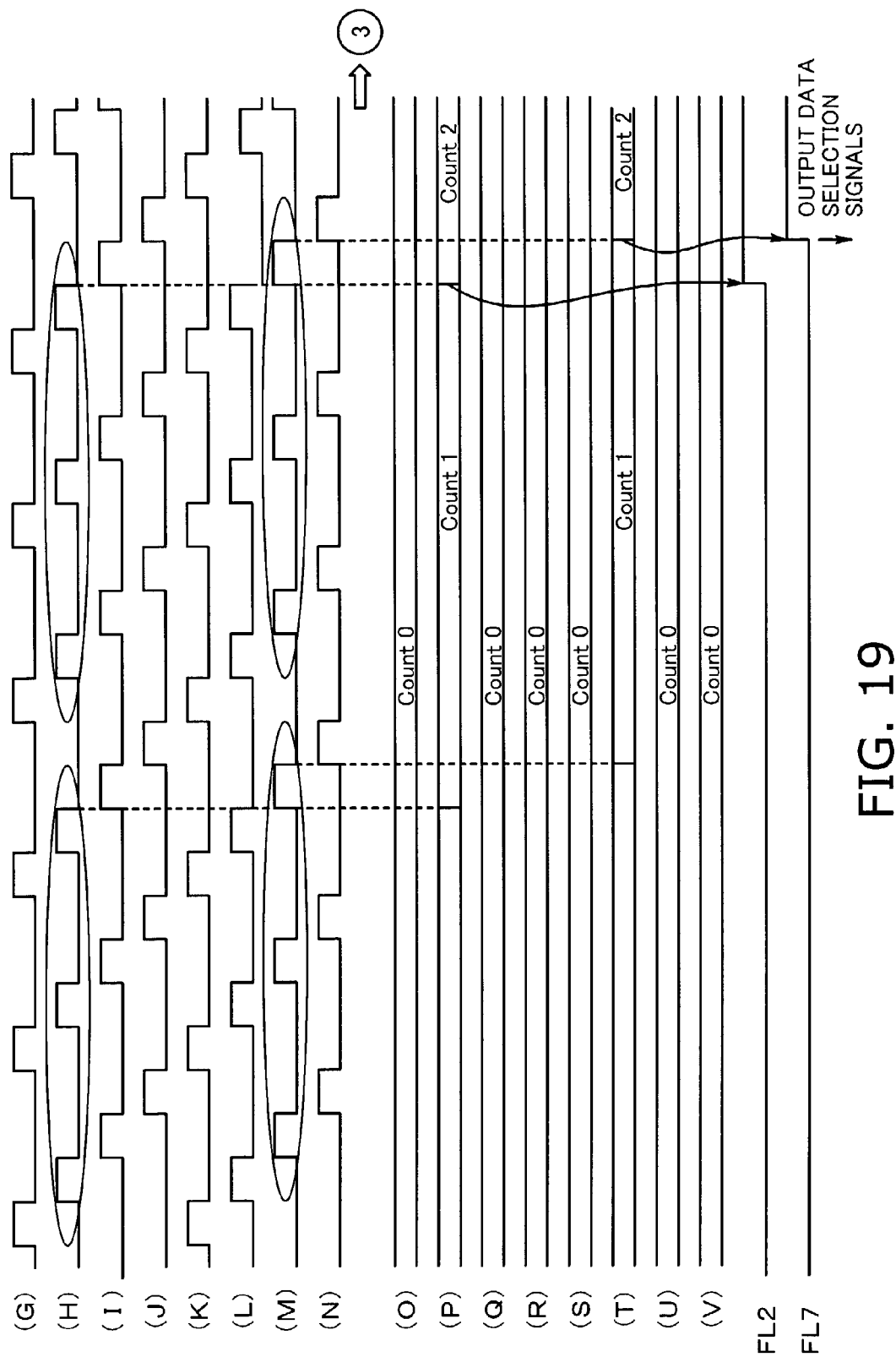
FIGS. 19 and 20 are a timing diagram showing how sync checking counters bring an in-sync state.
Figure 20:
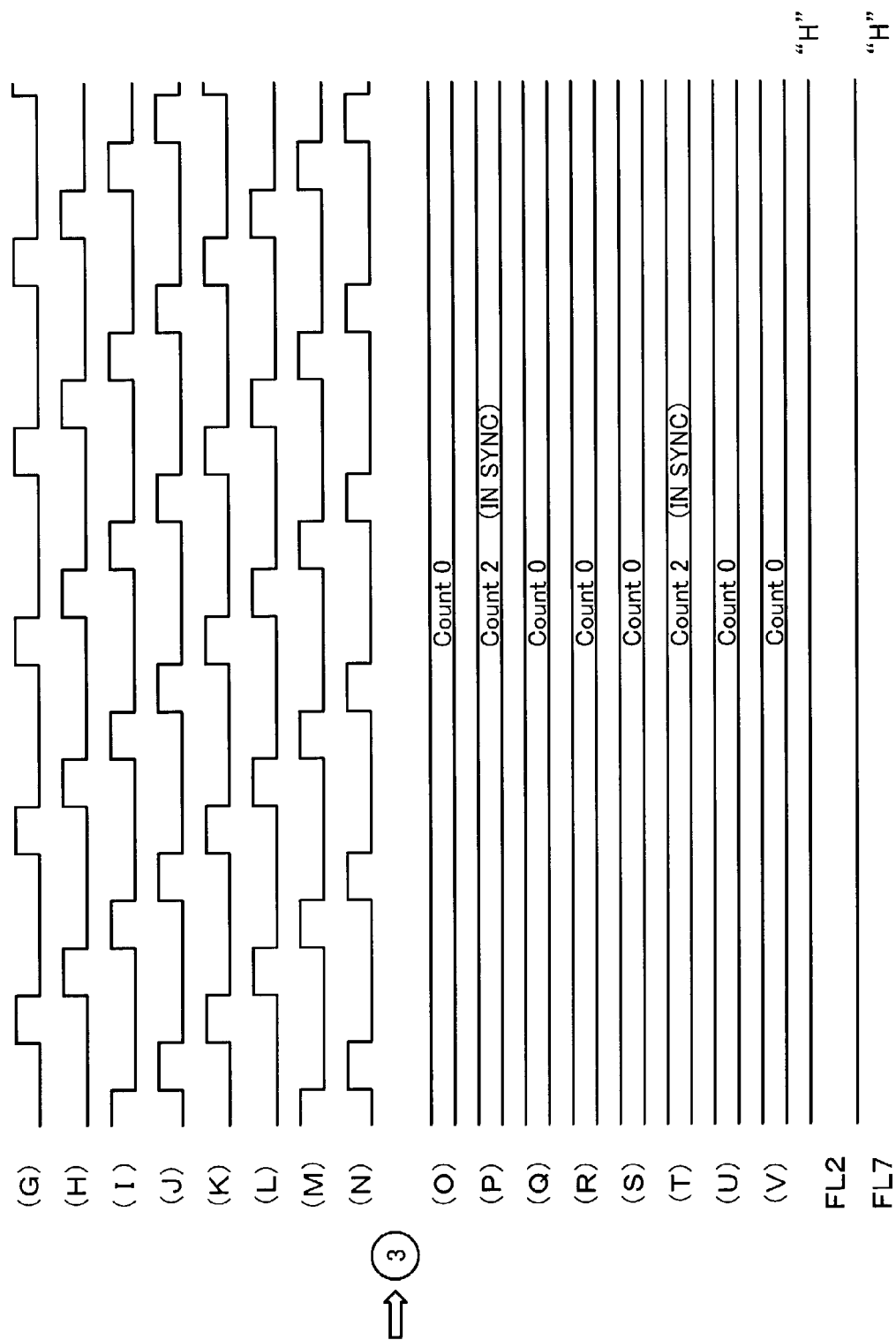

FIGS. 19 and 20 are a timing diagram showing how the synchronization is ensured by the sync checking counters. Shown in the lower half of this diagram are the states (O) to (V) of eight sync checking counters 203-1 to 203-8, respectively. The detection timing signals (G) to (N) are presented above them for the purpose of timing comparison.

As seen in FIG. 16, the eight sync checking counters 203-1 to 203-8 are arranged in such a way that they will receive different detection timing signals. More specifically, the upper four sync checking counters 203-1 to 203-4 receive the detection timing signals (G) to (J), respectively, besides being supplied with the first retimed data stream (E). Similarly, the lower four sync checking counters 203-5 to 203-8 receive the remaining detection timing signals (K) to (N), respectively, besides being supplied with the second retimed data stream (F).

Each sync checking counter 203-1 to 203-8 observes whether the sync pattern found in the given retimed data stream (E) or (F) is in phase with a given detection timing signal, and counts how many consecutive cycles they are in phase. If it reaches a predetermined threshold count, the sync checking counters 203-1 to 203-8 assert their respective outputs (called "in-sync flags") to an "H" state, thereby indicating that the phase of the given data stream is captured, or in other words, the in-sync state is identified. Note that, in the present example of FIGS. 19 and 20, the threshold count of the sync checking counters 203-1 to 203-8 is set to two.

As mentioned earlier, the second detection timing signal (H) matches with the sync patterns ("101") in the first retimed data stream (E), and the seventh detection timing signal (M) matches with those in the second retimed data stream (F). The former combination is therefore detected by the second sync checking counter 203-2 and indicated as an "H" state of the second in-sync flag FL2. Likewise, the latter combination is detected by the seventh sync checking counter 203-7 and indicated as an "H" state of the seventh in-sync flag FL7. FIGS. 19 and 20 show those two in-sync flags FL2 and FL7 that are activated upon detection of synchronization.

Figure 21:
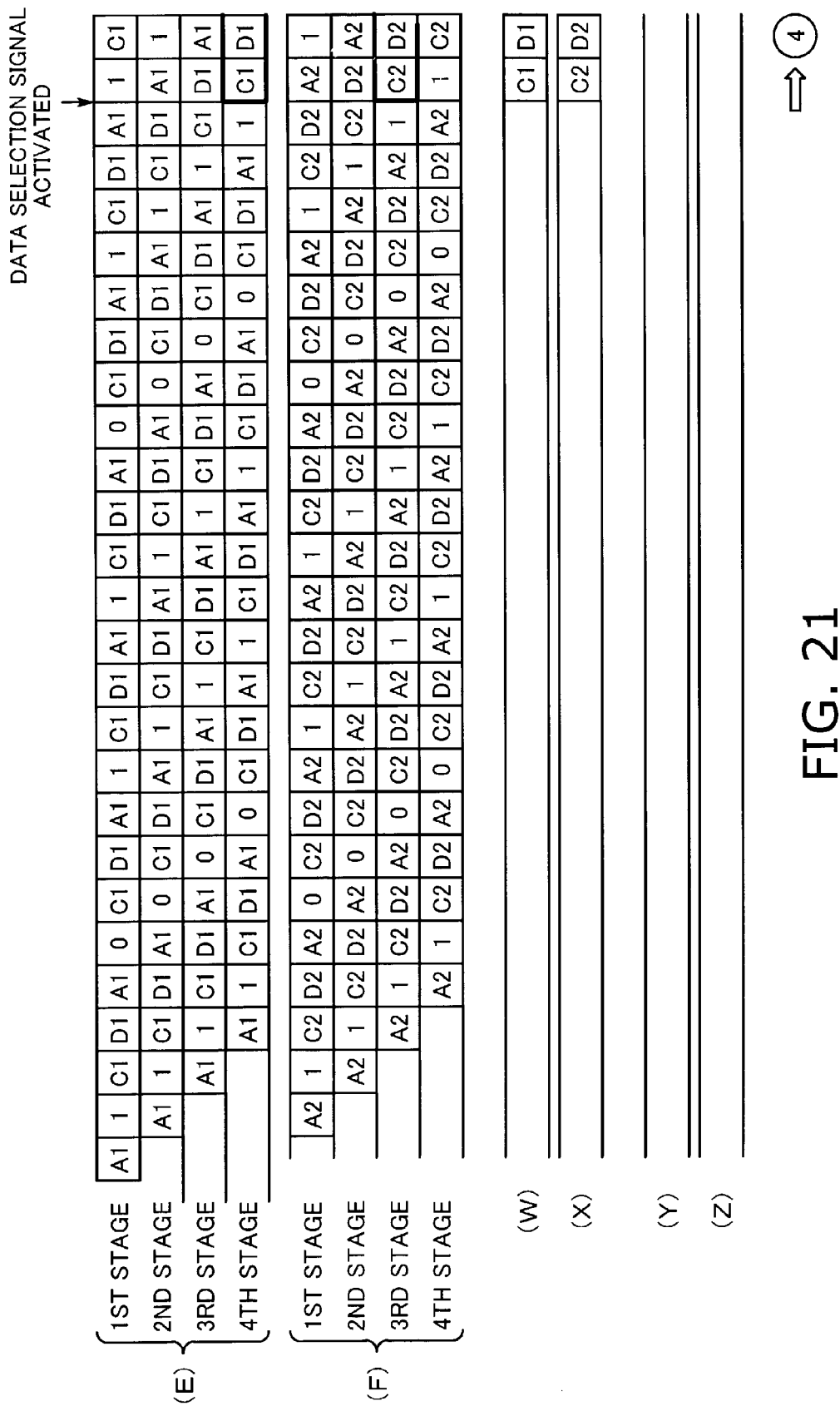
FIGS. 21 and 22 are a timing diagram showing a process that recovers parallel data streams from phase-shifted data streams.
Figure 22:
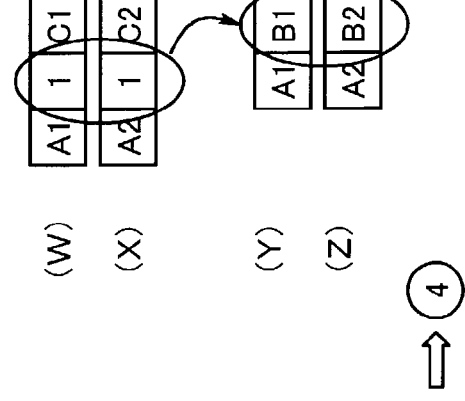

FIGS. 21 and 22 are a timing diagram showing a process that reconstructs parallel data streams from phase-shifted data streams. The shift registers 205-1 and 205-2 (FIG. 16) produce as many phase-shifted data streams as the number of bits contained in a data word plus its error correction code. This number is four in the present case since each data word consists of three data bits and one error correction bit added thereto. Accordingly, the first shift register 205-1 has four bitwise shift stages to output phase-shifted versions of the first retimed data stream (E) as shown in FIGS. 21 and 22. Similarly, the second shift register 205-2 has four bitwise shift stages to output phase-shifted versions of the second retimed data stream (F) as shown in FIGS. 21 and 22.

The selector 204 (FIG. 16) produces data selection signals from the in-sync flags FL2 and FL7 activated by the second and seventh sync checking counters 203-2 and 203-7. The data recovery unit 206 uses these data selection signals to choose appropriate data streams from among the phase-shifted data streams in such a way that the selected streams be in phase with each other (meaning that their propagation delay skews are canceled). The internal logic in the data recovery unit 206 determines which phase-shifted data streams to select, based on the given data selection signals. In the present example, it selects the fourth-stage output of the first shift register 205-1 and the third-stage output of the second shift register 205-2, which are shown in FIGS. 21 and 22 as skew-free retimed data streams (W) and (X).

After that, the data recovery unit 206 applies error correction operations to the selected retimed data streams (W) and (X). More specifically, it corrects each data word (A1, B1, C1) with its corresponding error correction bit D1, thereby reproducing the original first data stream (Y). Likewise, it corrects each data word (A2, B2, C2) with its corresponding error correction bit D2, thereby reproducing the original second data stream (Z). With such error correction operations, the data recovery unit 206 recovers the second bit slot (B1, B2) of every data word, while it has been used to convey sync pattern bits ("101"). The resultant data streams (Y) and (Z) are exactly identical to what were produced as parallel data streams at the sending end.

As seen from the above explanation, the present invention improves the quality of data transmission by solving the problems of skew variations. The present invention saves engineers from having to consider data delays caused by the wiring between separate units, thus offering more flexibility in designing electronic assemblies and backplane connections.

The foregoing data transmission system 1—1 can be modified in various ways. For example, the transmitter 100 may be configured to have an alarm data collector 13 as in the second embodiment, or an initial state detector 14 as in the third embodiment, so that the sync pattern inserter 103 will vary the frequency of sync pattern insertion (i.e., increase it for a predetermined period immediately after the system has recovered from failure, or immediately after the system has started up).

Also, the data transmission system 1—1 may be modified so as to operate as in the fourth embodiment. That is, the in-sync flags of the sync checking counters 203 (or data selection signals from the selector 204) are supplied back to the sync pattern inserter 103 in the transmitter 100, which serve as the synchronization status signal described in the fourth embodiment. When they indicate the in-sync state of the received data streams, the sync pattern inserter 103 reduces the frequency of sync pattern insertion. When they indicate the out-of-sync state, the sync pattern inserter 103 raises the frequency.

Further, the data transmission system 1—1 may be configure to provide the functions of the fifth embodiment described earlier. That is, the in-sync flags of the sync checking counters 203 (or data selection signals from the selector 204) may serve as the synchronization status signal described in the fifth embodiment. When activated, they holds the control functions of the sync pattern inserter 103, detection timing generator 202, and sync checking counters 203, thereby reducing their power consumption.

The above discussion will now be summarized as follows. According to the present invention, the proposed data transmission system produces a set of sync pattern-inclusive data streams at the sending end by inserting sync patterns to parallel data streams. At the receiving end, a reference clock is extracted from one of the sync pattern-inclusive data streams and used to retime all individual data streams. Pulse signals indicating sync patterns in the retimed data streams are then produced for use in adjusting the phases of the data streams. The proposed system thus provides a better level of transmission quality, without being affected by skew variations.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A data transmission system which transports data in parallel form, comprising:
(a) a transmitter comprising:
a serial-to-parallel converter which converts a serial data stream into a set of parallel data streams, and
a sync pattern inserter which generates a sync pattern and inserts the sync pattern to each of the parallel data streams, thereby producing sync pattern-inclusive data streams; and
(b) a receiver comprising:
a data retimer which extracts a reference clock from one of the sync pattern-inclusive data streams and produces retimed data streams by retiming all the sync pattern-inclusive data streams with the extracted reference clock, the sync pattern-inclusive data streams having been distorted with propagation delay skews,
an in-sync detector which produces pulse signals indicating the sync pattern present in each individual retimed data stream, and determines whether each retimed data stream is in an in-sync state, and
a phase adjuster which identifies the propagation delay skews by examining the pulse signals, and adjusts the phases of the retimed data streams to correct the propagation delay skews thereof.

2. The data transmission system according to claim 1, further comprising an alarm data collector which collects information about failure in the transmitter,
wherein the sync pattern inserter raises the frequency of sync pattern insertion for a predetermined period immediately after the collected information indicates that the transmitter has recovered from failure.

3. The data transmission system according to claim 1, further comprising an initial state detector which detects an initial state of the transmitter that has just started up,
wherein the sync pattern inserter raises the frequency of sync pattern insertion for a predetermined period immediately after the initial state is detected.

4. The data transmission system according to claim 1, wherein:
the in-sync detector produces a synchronization status signal that indicates whether the retimed data streams are in an in-sync state or an out-of-sync state; and
the sync pattern inserter inserts the sync patterns at a lower rate when the synchronization status signal indicates the in-sync state of the retimed data streams, and at a higher rate when the synchronization status signal indicates the out-of-sync state of the retimed data streams.

5. The data transmission system according to claim 1, wherein:
the in-sync detector produces a synchronization status signal that indicates whether the retimed data streams are in an in-sync state or an out-of-sync state; and
the sync pattern inserter and phase adjuster stop control functions thereof when the synchronization status signal indicates the in-sync state.

6. A receiver which receives data in parallel form, comprising:
a data retimer which extracts a reference clock from one of a plurality of sync pattern-inclusive data streams and produces retimed data streams by retiming all the sync pattern-inclusive data streams with the extracted reference clock, the sync pattern-inclusive data streams containing sync patterns and having been distorted with propagation delay skews;
an in-sync detector which produces pulse signals indicating the sync pattern present in each individual retimed data stream, and determines whether each retimed data stream is in an in-sync state; and a phase adjuster which identifies the propagation delay skews by examining the pulse signals, and adjusts the phases of the retimed data streams to correct the propagation delay skews thereof.

7. A data transmission system which transports data in parallel form, comprising:
(a) a transmitter comprising:
a serial-to-parallel converter which converts a serial data stream into a set of parallel data streams,
an error correction coding processor which applies an error correction coding algorithm to the parallel data streams, and
a sync pattern inserter which inserts sync patterns and the result of the error correction coding algorithm to the parallel data streams, thereby producing sync pattern-inclusive data streams; and
(b) a receiver comprising:
a data retimer which extracts a reference clock from one of the sync pattern-inclusive data streams and produces retimed data streams by retiming all the sync pattern-inclusive data streams with the extracted reference clock, the sync pattern-inclusive data streams having been distorted with propagation delay skews,
a detection timing generator which generates detection timing signals for use in detecting the sync patterns present in the retimed data streams,
a plurality of sync checking counters, each having an in-sync flag associated therewith, which compare the sync pattern found in each given retimed data stream with each given detection timing signal in terms of phases, and set the associated in-sync flag to indicate an in-sync state when phase matches are consecutively observed a predetermined number of times,
a selector which produces data selection signals, based on a combination of the in-sync flags being set,
a plurality of shift registers which shift the retimed data streams to produce phase-shifted data streams, and
a data recovery unit which selects from among the phase-shifted data streams a set of in-phase data streams according to the data selection signals, and detects and corrects errors in the selected in-phase data, based on the error correction coding algorithm, thereby reconstructing the original set of parallel data streams.

8. The data transmission system according to claim 7, further comprising an alarm data collector which collects information about failure in the transmitter,
wherein the sync pattern inserter raises the frequency of sync pattern insertion for a predetermined period immediately after the collected information indicates that the transmitter has recovered from a certain failure.

9. The data transmission system according to claim 7, further comprising an initial state detector which detects an initial state of the transmitter that has just started up,
wherein the sync pattern inserter raises the frequency of sync pattern insertion for a predetermined period immediately after the initial state is detected.

10. The data transmission system according to claim 7, wherein the sync pattern inserter inserts the sync patterns at a lower rate when notified of an in-sync state of the retimed data streams, and at a higher rate when notified of an out-of-sync state of the retimed data streams.

11. The data transmission system according to claim 7, wherein the sync pattern inserter, sync checking counters, and detection timing generator stop control functions thereof when notified of an in-sync state of the retimed data streams.

12. A receiver which receives data in parallel form, comprising:
a data retimer which extracts a reference clock from one of a plurality of sync pattern-inclusive data streams and produces retimed data streams by retiming all the sync pattern-inclusive data streams with the extracted reference clock, wherein the sync pattern-inclusive data streams are error correction coded, contain sync patterns, and have been distorted with propagation delay skews;
a detection timing generator which generates detection timing signals for use in detecting the sync patterns present in the retimed data streams;
a plurality of sync checking counters, each having an in-sync flag associated therewith, which compare the sync pattern found in each given retimed data stream with each given detection timing signal in terms of phases, and set the associated in-sync flag to indicate an in-sync state when phase matches are consecutively observed a predetermined number of times;
a selector which produces data selection signals, based on a combination of the in-sync flags being set;
a plurality of shift registers which shift the retimed data streams to produce phase-shifted data streams; and
a data recovery unit which selects from among the phase-shifted data streams a set of in-phase data streams according to the data selection signals, and detects and corrects errors in the selected in-phase data, based on the error correction coding algorithm, thereby reconstructing the original set of parallel data streams.

* * * * *